(12) United States Patent
Tomko et al.

(10) Patent No.: US 7,943,698 B2
(45) Date of Patent: May 17, 2011

(54) MOISTURE CURE ALPHA-SILANE MODIFIED ACRYLIC COATINGS

(75) Inventors: Richard F. Tomko, North Olmsted, OH (US); Wai-Kwong Ho, North Olmsted, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 30 days.

(21) Appl. No.: 12/332,460

(22) Filed: Dec. 11, 2008

(65) Prior Publication Data

US 2009/0163645 A1 Jun. 25, 2009

Related U.S. Application Data

(60) Provisional application No. 61/015,848, filed on Dec. 21, 2007.

(51) Int. Cl.
*C08L 83/00* (2006.01)
(52) U.S. Cl. ....................................................... 525/102
(58) Field of Classification Search ................... 525/102
See application file for complete search history.

(56) References Cited

U.S. PATENT DOCUMENTS

| 7,074,856 B2 * | 7/2006 | Ho et al. ................ 525/100 |
| 2009/0075096 A1 * | 3/2009 | Butikofer et al. ............. 428/447 |

* cited by examiner

*Primary Examiner* — Bernard Lipman
(74) *Attorney, Agent, or Firm* — Vivien Y. Tsang; Robert E. McDonald; Deron A. Cook

(57) ABSTRACT

An ambient temperature curing coating composition comprising the crosslinked reaction product of:

(a) an amino-functional compound, wherein the amino-functional compound is a bis-silylamine of general formula:

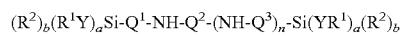

$(R^2)_b(R^1Y)_a Si-Q^1-NH-Q^2-(NH-Q^3)_n-Si(YR^1)_a(R^2)_b$ $n \geq 0$
$a = 3-b$
$b = 0, 1, 2$ each Y is independently a heteroatom, selected from O, N; if Y is N, then the valency of Y is 2; if Y is O, then the valency of Y is 1;

each $R^1$ is independently a monovalent radical (e.g., hydrogen, hydrocarbon including but not limited to alkyl (linear or branched), cycloalkyl, aryl, allyl, or aralkyl. Preferably, $R^1$ is an alkyl of 1-10 carbon atoms. Each $R^1$ may be the same or different;

$R^2$ is a monovalent radical, and can include heteroatoms (e.g., oxygen, nitrogen, sulfur) not directly bonded to the silicon atom, including but not limited to, alkyl (linear or branched), cycloalkyl, aryl, allyl, or aralkyl. Each $R^2$ may be the same or different.

$Q^1$, $Q^2$, $Q^3$ is a divalent bridging group, including but not limited to an alkylene, but preferably is a $C_1$-$C_{12}$ alkylene, and can be branched or cyclic; each Q can be the same or different; and (b) an acrylic polymer containing pendant organofunctional α-silane groups.

9 Claims, No Drawings

MOISTURE CURE ALPHA-SILANE MODIFIED ACRYLIC COATINGS

This application claims the benefit of U.S. provisional patent application No. 61/015,848 filed on Dec. 21, 2007, the entirety of which is hereby incorporated by reference.

Many high performance, high solids coating compositions in the art are based on polymeric systems comprised of either polyester-based or polyacrylic-based polyols and crosslinking agents thereof. These coatings are generally supplied as two component or "two-pack" systems. In a typical two-pack system, the crosslinking agent is combined shortly before application, with curing being conducted at ambient or elevated temperatures. While two pack systems often provide high performance properties like corrosion resistance, humidity resistance, and resistance to solvents. These properties are notable limitations of one-pack systems. Two-pack systems utilizing isocyanate crosslinkers require special handling and storage operations to prevent premature reaction with moisture and to avoid human exposure. Further, the components of two-pack systems can only be mixed shortly prior to use and once mixed must be used and ultimately be discarded. Another disadvantage of isocyanate-crosslinking systems is that the quality of the coating is compromised by bubble formation during thick film application. A more desirable coating composition is an ambient curing, one component or one-pack system where all of the coating ingredients are combined into a single, storage stable mixture. At the same time the one-pack system should exhibit the same high performance film properties as a two-pack system and be isocyanate free.

The coating composition of the present invention is a one-pack acrylic system that has the desired film properties of two-pack polyurethane coatings, such as corrosion and humidity resistance, short dry times, chemical resistance, good ultraviolet resistance and high gloss potential. The coating is moisture-curable, isocyanate-free, and VOC compliant, with a high solids content (>70% by weight) and a low VOC (<3 pounds per gallon). On exposure to moisture, the applied coating composition of the invention is a crosslinked reaction product of bis-silylamine and an acrylic polymer having pendant organofunctional α-silane groups.

The prior art teaches moisture curable coatings formed from (meth)acrylate polymers containing pendant alkoxysilyl groups. These are described in U.S. Pat. Nos. 3,453,136; 3,453,230; 4,603,064; 4,614,777; 5,017,668; and 5,705,651. U.S. Pat. No. 5,399,607 discloses a mixture of acrylic resins with hydroxyl and alkoxysilyl containing acrylic copolymers to make moisture curable coatings.

U.S. Pat. No. 4,789,710 depicts silanated resins reacted with amino-silanes and further reacted with an isocyanate-functional alkoxysilane. U.S. Pat. No. 5,017,668 describes a long chain amino-silane monomer copolymerized to make a curable acrylic silane polymer. U.S. Pat. No. 5,459,205 discloses a process to make more flexible coatings based on moisture curable resins having long pendant silane-containing moieties. These resins are prepared from silane containing macromonomers copolymerized with conventional monomers. The macromonomers may contain aminosilane moieties; however, the coatings require baking at 60° C. with a tin catalyst.

U.S. Patent Application 2002/0040102 describes an ambient temperature curing coating composition comprising a polysiloxane, an alkoxysilyl-functional acrylic polymer, and a curing catalyst. The invention further relates to the preparation of an alkoxysilyl-functional acrylic polymer.

U.S. Pat. No. 7,074,856 describes coating compositions comprising the crosslinked reaction product of an amino-functional compound, such as bis-silyl amine, with an acrylic polymer having pendant alkoxysilane (and optionally epoxy) groups.

We have found that coatings consisting of the silane-functional acrylic polymers and amines, as described in the above prior art, lack the desired solvent resistance of two-pack urethane coatings, or exhibit reduced shelf life especially at elevated temperatures, or exhibit slow dry and cure times. Primary aminosilanes such as aminopropyltrimethoxysilane, when reacted with silane-functional acrylic polymers, offer some improved solvent resistance. According to this invention, it has been found that coatings consisting of α-silanes incorporated into the backbone of acrylic polymers, when reacted with secondary aminosilanes such as bis-silylamines, exhibit prolonged shelf-life and much improved dry and cure times at ambient temperatures.

SUMMARY OF THE INVENTION

An ambient temperature curing coating composition comprising the crosslinked reaction product of:
(a) an aminosilane-functional compound, wherein the aminosilane-functional compound is a bis-silylamine of general formula:

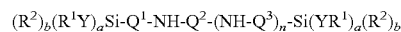

$n \geq 0$ $a = 3-b$ $b = 0, 1, 2$ each Y is independently a heteroatom, selected from O, N; if Y is N, then the valency of Y is 2; if Y is O, then the valency of Y is 1;

each $R^1$ is independently a monovalent radical (e.g., hydrogen, hydrocarbon including but not limited to alkyl (linear or branched), cycloalkyl, aryl, allyl, or aralkyl. Preferably, $R^1$ is an alkyl of 1-10 carbon atoms. Each $R^1$ may be the same or different;

$R^2$ is a monovalent radical, and can include heteroatoms (e.g., oxygen, nitrogen, sulfur) not directly bonded to the silicon atom, including but not limited to, alkyl (linear or branched), cycloalkyl, aryl, allyl, or aralkyl. Each $R^2$ may be the same or different.

$Q^1, Q^2, Q^3$ is a divalent bridging group, including but not limited to an alkylene, but preferably is a $C_1$-$C_{12}$ alkylene, and can be branched or cyclic;

each Q can be the same or different; and (b) an acrylic polymer containing pendant organofunctional α-silane groups.

This invention also relates to articles having the above claimed cured coating compositions on at least one surface thereof.

DETAILED DESCRIPTION OF THE INVENTION

The one pack moisture curable coating composition of this invention comprises a crosslinked reaction product of a bis-silylamine and an acrylic polymer having pendant α-silane groups.

The bis-silylamine of this invention generally has the formula:

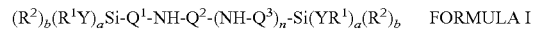  FORMULA I $n \geq 0$ $a = 3-b$ $b = 0, 1, 2$ each Y is independently a heteroatom, selected from O, N; if Y is N, then the valency of Y is 2; if Y is O, then the valency of Y is 1;

each $R^1$ is independently a monovalent radical (e.g., hydrogen, hydrocarbon including but not limited to alkyl (linear or branched), cycloalkyl, aryl, allyl, or aralkyl. Preferably, $R^1$ is an alkyl of 1-10 carbon atoms. Each $R^1$ may be the same or different;

$R^2$ is a monovalent radical, and can include heteroatoms (e.g., oxygen, nitrogen, sulfur) not directly bonded to the silicon atom, including but not limited to, alkyl (linear or branched), cycloalkyl, aryl, allyl, or aralkyl. Each $R^2$ may be the same or different.

$Q^1$, $Q^2$, $Q^3$ is a divalent bridging group, including but not limited to an alkylene, but preferably is a $C_1$-$C_{12}$ alkylene, and can be branched or cyclic;

each Q can be the same or different.

For the purpose of the present invention a bis-silylamine is generally of Formula I described above. For example, in general, a bis-silylamine can be a bis-(trialkoxysilylalkyl)amine. Specific examples of these bis-silylamines are bis-(3-trimethoxysilylpropyl)amine, bis-(3-triethoxysilylpropyl)amine, bis-(3-trimethoxysilyl 2-methylpropyl)amine, and bis-(3-triisopropoxysilylpropyl)amine. Also included are asymmetrical secondary silylamines such as N-(3-triethoxysilylpropyl)-N-(5-triethoxysilylpentyl)amine. A bis-silylamine, namely bis-(3-trimethoxysilylpropyl)amine, under the trade name SILQUEST® A-1170, is available from Momentive Corporation. This and similar bis-silylamines can be made according to the methods known in the art, e.g., as taught in U.S. Pat. No. 4,526,996 (see column 5 line 54 through column 11 line 26) and U.S. Pat. No. 5,101,055.

Other examples of bis-silylamines can include bis-silylamines modified with long chain alcohols, branched alcohols, cyclic alcohols, aralkyl alcohols such as benzyl alcohols. Generally, the alcohol exchange can be accomplished by the reaction of bis-silylamine with an alcohol at elevated temperature in the presence of a suitable catalyst. For example, SILQUEST® A-1170 may accommodate the exchange of up to six moles of alcohol, preferably from one to four moles, most preferably 2.5 moles of alcohol. In a preferred process for producing a modified bis-silylamine, the bis-silylamine, the appropriate alcohol and suitable catalyst are charged to the reactor under nitrogen purge and heated to 80° C. The reaction can be followed by alcohol distillation and/or infrared spectroscopy. The preferred catalyst is sodium methoxide from 0.01% to 0.1% by weight on the total charge.

The amount of bis-silylamine or modified bis-silylamine present in the binder composition can be about 1% by weight to about 35% by weight based on the total weight of binder solids. Binder solids include the bis-silylamine crosslinker, the acrylic polymer having pendant alkoxysilane groups, and any reactive diluent.

The bis-silylamines or modified bis-silylamines are blended with an acrylic polymer containing pendant organofunctional α-silane groups. The α-silane acrylic polymers can be prepared by addition polymerization of at least two different ethylenically unsaturated monomers whereby at least one of the monomers is an organofunctional α-silane. Examples of ethylenically unsaturated monomers are acrylic esters such as butyl(meth)acrylate, methyl(meth)acrylate, ethyl (meth)acrylate, propyl(meth)acrylate, n-hexyl(meth)acrylate, isopropyl(meth)acrylate, isobutyl (meth)acrylate, 2-ethylhexyl(meth)acrylate, cyclohexyl(meth)acrylate, 2,2,5-trimethylcyclohexyl (meth)acrylate, isobornyl(meth)acrylate, lauryl(meth)acrylate, methacrylonitrile, and vinyl compounds such as styrene, acrylonitrile, α-methyl styrene, vinyl toluene, and vinyl acetate, wherein the notation (meth)acrylate means acrylate or methacrylate. Also, monomers containing reactive functional groups such as epoxy-functional monomers like glycidyl methacrylate or silane-functional monomers like 3-((meth)acryloxy)propyltrimethoxysilane (such as Dow Corning® Z-6030) or any other functional monomer would allow a stable coating formulation as can be contemplated by one skilled in the art.

An organofunctional α-silane, in general, can be any silane with a methylene bridge between the silicon atom and the functional group, generally of the following formula:

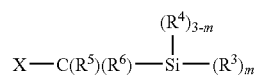

wherein

X=O, N or S, substituted or unsubstituted, and wherein X is a reactive functional group; for example, —X can be an ester linkage such as —O—C(O)—C(CH$_3$)=CH$_2$, —NCO, —NH$_2$, etc.;

$R^3$ is a hydrolyzable group;

$R^4$ is a monovalent hydrocarbon;

$R^5$ and $R^6$ are independently hydrogen or alkyl;

m is independently in each occurrence an integer of 1 to 3.

Examples of organofunctional α-silane monomers for free radical polymerization are (methacryloxymethyl)methyldimethoxysilane, (methacryloxymethyl)trimethoxysilane, (methacryloxymethyl)methyldiethoxysilane, and (methacryloxymethyl)triethoxysilane. As commercial products, GENIOSIL® XL-30 series, such as GENIOSIL® XL-32, XL-33, XL-34 and XL-36, manufactured by Wacker Chemie AG, may be used. In accordance with this invention, as another method of forming an acrylic polymer containing pendant alpha silane groups, the X-functionality of the organofunctional α-silane reacts with a complementary functionality of the acrylic polymer.

The amount of organofunctional α-silane present in the acrylic polymer composition can be about 1% to about 50% by weight, preferably 2% to 25% by weight, and most preferably, 5% to 15% by weight, of the total weight of monomers.

The polymerization or other modification of the acrylic polymer with pendant organofunctional α-silane groups can be carried out in a non-functional volatile solvent, such as xylene, toluene, and other aromatics, t-butyl acetate, n-butyl acetate, and other ester solvents. In general, suitable solvents or reactive diluents include those that will not polymerize with the monomers, and will not react with the bis-silylamine curing agent or organofunctionality of the α-silane. Non-hazardous air pollutants (non-HAPs), non-volatile organic compounds (non-VOC), halogenated aromatic solvents such as Oxsol 100 (Occidental Chemical) can also be used as non-functional volatile solvents.

As an example, the solvent is charged to the reactor and the monomers, α-silane-containing monomer, initiator and chain transfer agent can be mixed together as one feed, and then polymerized and chased with additional solvent and initiator. For example, the solvent can be heated to a temperature at about 90° C., and the monomers, initiator, and chain transfer agent can be added over a period of 3-4 hours, preferably in 3 hours, while the temperature of the solution is maintained during the addition and for a further period of 0.5 to 4 hours after the addition. The temperature can then be increased to about 100° C., and then a further charge of initiator may be added during this further period to reduce the level of unreacted monomer. However, it is also possible to reduce this level by distillation of the unreacted monomer from the reaction mixture.

Alternatively, the solvent can be charged in the reactor and heated to a temperature of about 90° C., and the monomers and chain transfer agent can be mixed together as one feed, and the initiator and optional solvent can be added in a separate feed.

Free radical polymerization is often used in the coatings industry to produce a wide variety of polymers. Resins with narrow molecular weight distributions (polydispersity) are desirable because of the decrease in viscosity due to fewer high molecular weight chains. Conventional free radical solution polymerization produces resins with polydispersities of 2 or greater because radical termination by chain coupling leads to higher molecular weight chains which broadens the molecular weight distribution and increases the viscosity of the polymer solution. Controlled radical polymerization agents may be used to make resins of lower polydispersity or lower viscosity or block copolymers or polymers where each polymer chain has the same monomer composition. Generally, any of the free radical initiators known to the art can be utilized. Suitable free radical initiators include any of the alkyl peroxides such as tert-amyl and tert-butyl peroxides, di-tert-butyl peroxide, peresters such as tert-butyl perbenzoate, tert-butyl peroxy-3,5,5-trimethylhexanoate, 2,5-bis(2-ethylhexanoyl-peroxy)-2,5-dimethylhexane, or tertiary butyl peroctoate, and any of the various known azo initiators such as 2,2'-azo-bis-isobutyronitrile. Particularly preferred are 2,2'-azo-bis-isobutyronitrile or 2,2'-azo-bis(2-methylbutyronitrile) (Vazo 67 from DuPont). For example, the weight of the free radical initiator used (by weight based on monomers) is generally at least 0.5%. A chain transfer agent, such as a mercaptosilane chain transfer agent (for example, (3-mercaptopropyl)trimethoxysilane, Silquest® A-189 available from Momentive Corporation) can be utilized during the free radical polymerization of the invention. In addition, other chain transfer agents could be used with A-189 such as alkyl thiols (e.g. dodecanthiol) and the like. The amount of chain transfer agent used (by weight based on monomers) is generally at least 0.5%, preferably 1 to 10%, or a level of 0.5 to 7% initiator can be used in conjunction with 1 to 10% chain transfer agent.

The acrylic polymer containing pendant organofanctional α-silane groups comprises a mixture of (a) 1% to 50% by weight of one or more ethylenically unsaturated monomers, whereby at least one of the unsaturated monomers can be an acrylic ester such as butyl(meth)acrylate, methyl(meth)acrylate, ethyl(meth)acrylate, propyl(meth)acrylate, n-hexyl (meth)acrylate, isopropyl(meth)acrylate, isobutyl(meth) acrylate, 2-ethylhexyl(meth)acrylate, cyclohexyl (meth) acrylate, 2,2,5-trimethylcyclohexyl(meth)acrylate, isobornyl (meth)acrylate, lauryl (meth)acrylate, 3-((meth)acryloyloxy) propyltrimethoxysilane wherein the notation (meth)acrylate means acrylate or methacrylate. Other unsaturated monomers can include vinyl compounds such as styrene, acrylonitrile, α-methyl styrene; and (b) 1% to 50% by weight of an organofunctional α-silane monomer.

In one embodiment, the acrylic polymer composition comprises from 1% by weight to 35% by weight of the organofunctional α-silane of the total weight of acrylic polymer containing the pendant organofunctional α-silane groups.

The coating composition produced from the mixture of an acrylic polymer containing pendant organofunctional α-silane groups and bis-silylamine is cured by ambient moisture. A secondary curing agent is not necessary to initiate the curing reaction. The coating compositions of the invention generally cure at ambient temperatures, for example 0° C. to 30° C. The coating compositions of the invention alternatively can be cured at elevated temperatures, for example from 30° C. to 130° C., to speed up the curing. The VOC for the coatings described in this invention is below 3.0 pounds/ gallon or less than 359 grams/liter.

Depending on the field of application, the coating compositions of the invention may further comprise one or more additional ingredients common to the paint industry. They may comprise one or more pigments, like titanium dioxide, coloring agents such as yellow or red iron oxide or a phthalocyanine pigment, pigment dispersing agents, light stabilizers, thixotropic agents, and/or one or more strengthening pigments such as micaceous iron oxide or crystalline silica and/or one or more anticorrosive pigments such as metallic zinc, zinc phosphate, wollastonite and/or a filler pigment such as barytes, talc or calcium carbonate. The composition may comprise a thickening agent such as fine-particle sized silica, bentonite clay, hydrogenated castor oil, or a polyamide wax.

The coating compositions of the invention in general can be used as finish coatings and/or primer coatings. Finished coating compositions exhibit high gloss which is retained remarkably well on weathering and UV exposure. They are particularly suitable for coating substrates which are exposed to weather for long periods. The highest levels of gloss may be achieved if the coating composition includes an organic solvent such as xylene. The coating composition may also contain an alcohol, e.g. methanol, ethanol or other alcohols which has the added benefit of improving stability.

A finish coating according to the invention can be applied over various unprimed or primed coating surfaces. The coating composition can be used as a finished coat on concrete, buildings, steel structures, automobiles, aircraft and other vehicles, general industrial machinery, plastics and wood. The finished coat can be either pigmented or clear (non-pigmented). The coating composition can also be applied directly to metal substrates like Bonderite, cold rolled steel, galvanized steel, hot dipped steel, blasted steel, and aluminum.

The coating composition of the invention alternatively can be used as a protective primer coating, particularly on steel surfaces, for example bridges, pipelines, industrial plants or buildings, oil and gas installations, or ships. For this use it is generally pigmented with anticorrosive pigments. Primer coating compositions according to the invention can be used as maintenance and repair coatings on less than perfect surfaces such as aged blasted steel, hand-prepared weathered steel, and aged coatings. These primer coating compositions can be readily topcoated, particularly with the coatings of this invention with good inter-coat adhesion.

The invention will be elucidated with reference to the following examples. These are intended to illustrate the invention but are not to be construed as limiting in any manner the scope thereof.

EXAMPLES

Resin Examples

Table 1 illustrates eight α-silane modified acrylic resin binders prepared using the following procedure and weight percents of monomers, based on the total monomer weight, and additives:

TABLE 1

|  | Component | Ex. 1 Wt % | Ex. 2 Wt % | Ex. 3 Wt % | Ex. 4 Wt % | Ex. 5 Wt % | Ex. 6 Wt % | Ex. 7 Wt % | Ex. 8 Wt % |
|---|---|---|---|---|---|---|---|---|---|
| Charge | Xylene | 25.98 | 25.39 | 25.33 | 25.98 | — | — | — | — |
|  | t-Butyl Acetate | — | — | — | — | 25.28 | 19.58 | 19.58 | 19.58 |
| Monomers | Methyl Methacrylate | 21.28 | 21.80 | 21.74 | 21.28 | 20.77 | 20.77 | 20.77 | 20.77 |
|  | 2-Ethylhexyl acrylate | 20.71 | 21.21 | 21.16 | 20.71 | 20.17 | 20.17 | 20.17 | 20.17 |
|  | Styrene | 13.39 | 13.71 | 13.68 | 13.39 | 13.06 | 13.06 | 13.06 | 13.06 |
|  | Methacryloxypropyl-trimethoxysilane (Dow Corning ® Z-6030) | 10.49 | — | 5.36 | — | — | 3.83 | 3.83 | 1.92 |
|  | (Methacryloxy-methyl)methyl-dimethoxysilane (Genosil ® XL32) | — | — | 4.41 | — | — | — | 3.83 | 5.75 |
|  | Methacryloxymethyl-Trimethoxysilane (Genosil ® XL-33) | — | 9.53 | — | — | 7.66 | 3.83 | — | — |
|  | Methacryloxymethyl-Triethoxysilane (Genosil ® XL-36) | — | — | — | 10.49 | — | — | — | — |
| Chain Transfer Agent | (3-mercaptopropyl)-trimethoxysilane (Silquest ® A189) | 2.79 | 2.86 | 2.86 | 2.79 | 7.66 | 7.66 | 7.66 | 7.66 |
| Initiator | Vazo 67 | 1.34 | 1.38 | 1.37 | 1.34 | 1.40 | 1.40 | 1.40 | 1.40 |
| Chase | Vazo 67 | 0.25 | 3.86 | 5.10 | 0.25 | 0.43 | 0.43 | 0.43 | 0.43 |
|  | Xylene | 3.76 | 0.26 | 3.85 | — | — | — | — | — |
|  | t-Butyl Acetate | — | — | — | 3.76 | 3.57 | 9.28 | 9.28 | 9.28 |
|  | NVM* | 69.2 | 69.9 | 69.2 | 69.4 | 69.5 | 69.5 | 68.5 | 68.0 |

*Non-volatile material

Charge the xylene or t-butyl acetate to the reactor and heat to 90° C. under nitrogen. Feed monomers, chain transfer agent and initiator over 3 hours with stirring and hold for one hour. Heat to 95° C. and feed chase over 3 hours. Heat to 99° C. and hold for one hour. Cool and filter resin through a 150 micron filter bag.

Paint Examples

The following coating compositions were prepared utilizing the resins of Examples 1-8 above. For pigmented paint (examples 9 to 12), the process comprises a grind phase and a letdown phase. In the grind phase, a high shear blade such as Cowles is used. The resin is charged at a pigment:binder ratio of 2 to 2.5 based on resin solids. The pigment dispersant (such as A-1230) is then added and mixed at medium speed for 5 minutes. Titanium dioxide pigment (such as CR-828) is added to the mixture and mixed at high speed for at least 25 minutes until a Hegman grind of 6 is achieved. In the letdown phase, under low agitation with a propeller or turbine blade, the remainder of the resin is added to the grind slurry followed by the bis-silylamine (such as Silquest A-1170). Appropriate amount of solvent (such as xylene) is added as a reducing agent in attaining suitable application viscosity. For clear formulations (as in examples 13 to 16), the process comprises charging all the resin and the bis-silylamine and mixing under low agitation until homogeneous with a propeller blade.

TABLE 2

|  | Ex. 9 Wt % | Ex. 10 Wt % | Ex. 11 Wt % | Ex. 12 Wt % | Ex. 13 Wt % | Ex. 13C Wt %(***) | Ex. 14 Wt % | Ex. 15 Wt % | Ex. 16 Wt % |
|---|---|---|---|---|---|---|---|---|---|
| Resin | Ex. 1 | Ex. 2 | Ex. 3 | Ex. 4 | Ex. 5 | Ex 5 | Ex. 6 | Ex. 7 | Ex. 8 |
|  | 53.90 | 52.80 | 53.69 | 53.55 | 89.84 | 93.17 | 90.38 | 90.21 | 89.82 |
| A-1230* | 1.76 | 1.72 | 1.75 | 1.75 | — | — | — | — | — |
| CR-828** | 35.15 | 34.42 | 35.00 | 34.92 | — | — | — | — | — |
| bis-(3-trimethoxysilylpropyl) amine (SILQUEST ® A1170) | 5.37 | 6.02 | 5.87 | 5.12 | 10.16 | — | 9.62 | 9.79 | 10.18 |
| gamma-Aminopropyl-triethoxy silane (SILQUEST ® A1100) | — | — | — | — | — | 6.83 | — | — | — |
| Xylene | 3.82 | 5.04 | 3.69 | 4.66 | — | — | — | — | — |

*A-1230 is a pigment dispersant from Momentive Corporation.
**CR-828 is a titanium dioxide pigment from Kerr McGee.
(***)A comparative example utilizing the resin of Ex. 5 with an aminosilane.

Testing

Cold rolled steel panels (4"×12", 6"×12") are coated with the coating compositions of Examples 9-16 at a 2 micron to 4 micron dry film thickness and dried at ambient temperature. The following gloss and hardness results are obtained from the coating compositions.

TABLE 3

|  | Ex. 9 | | Ex. 10 | | Ex. 11 | | Ex. 12 | |
| --- | --- | --- | --- | --- | --- | --- | --- | --- |
|  | 7 days | 28 days | 7 days | 28 days | 7 days | 28 days | 7 days | 28 days |
| Dry film thickness | 2.975 | 2.904 | 3.04 | 2.73 | 3.12 | 2.69 | 4.065 | |
| 20° gloss | 80.1 | 78.2 | 43.3 | 43.7 | 78.2 | 76.5 | 71.1 | 67.5 |
| 60° gloss | 89.7 | 89 | 73.6 | 73.1 | 89.2 | 87.9 | 84.4 | 82.2 |
| Pencil Hardness | H | 3 H | 2 H | 4 H | H | 3 H | 3 H | 2 H |
| Direct Impact Resistance (inch-pounds) | 34 | 36 | 36 | 24 | 38 | 40 | 40 | 40 |
| Chemical resistance: 24-Hour Chemical Spot Resistance | | | | | | | | |
| Methyl isobutyl ketone (MIBK) | 1 | 5 | 5 | 5 | 1 | 5 | 3 | 5 |
| Ethanol | 3 | 5 | 5 | 5 | 5 | 5 | 5 | 5 |
| Toluene | 1 | 1 | 5 | 1 | 1 | 1 | 1 | 5 |
| Methyl ethyl ketone (MEK) | 2 | 2 | 5 | 4 | 1 | 5 | 5 | 5 |
| Formula 409 | 5 | 5 | 5 | 5 | 5 | 5 | 5 | 5 |
| 10% $H_2SO_4$ | 5 | 5 | 5 | 5 | 5 | 5 | 5 | 5 |
| 10% citric acid | 5 | 5 | 5 | 5 | 5 | 5 | 5 | 5 |
| 10% acetic acid | 2 | 2 | 2 | 2 | 2 | 2 | 2 | 2 |
| Brake Fluid | 3 | 3 | 4 | 4 | 5 | 3 | 3 | 3 |
| Butyl acetate | 1 | 2 | 1 | 5 | 1 | 5 | 5 | 5 |
| Methyl amyl ketone (MAK) | 1 | 5 | 5 | 5 | 1 | 5 | 5 | 5 |
| Motor Oil | 3 | 5 | 5 | 5 | 3 | 5 | 5 | 5 |
| Unleaded gas | 1 | 5 | 3 | 5 | 3 | 5 | 3 | 5 |
| 25% NaCl | 5 | 5 | 3 | 5 | 3 | 5 | 3 | 3 |
| 10% $(NH_4)_2SO_4$ | 5 | 5 | 5 | 5 | 5 | 5 | 5 | 5 |
| 10% NaOH | 5 | 5 | 3 | 5 | 5 | 5 | 5 | 5 |
| 10% $HNO_3$ | 5 | 5 | 5 | 5 | 2 | 5 | 5 | 5 |

RATINGS KEY TO CHEMICAL SPOT RESISTANCE: 24-hours of contact with chemical, wiped dry and visually rated immediately.
1 = Delamination
2 = Blistering
3 = Discoloration
4 = Slight visual change
5 = No change.

TABLE 4

|  | Ex. 13 | Ex. 13 C | Ex. 14 | Ex. 15 | Ex. 16 |
| --- | --- | --- | --- | --- | --- |
| Dry film thickness | 1.82 | 1.675 | 2.045 | 1.885 | 1.58 |
| 20° gloss | 82.6 | 70.4 | 92.3 | 91.3 | 91.5 |
| 60° gloss | 108 | 110 | 110 | 109 | 111 |
| Dry times (@ ambient temperature): | | | | | |
| Dry to touch | 10 min | 15 min | 30 min | 3 hr | 2 hr |
| Tack free | 15 min | 1 hr | 1 hr | 4 hr | 3.5 hr |
| Through dry | 45 min | 4.5 hr | 3 hr | 9.25 hr | 8 hr |
| Pencil Hardness: | | | | | |
| 1 day | B | H | 2 B | 3 B | 2 |
| 2 days | 2 H | 2 H | 2 H | HB | 2 H |
| 3 days | 3 H | 2 H | 3 H | HB | 2 H |
| 4 days | 3 H | 2 H | 3 H | H | H |
| 9 days | 3 H | 3 H | 3 H | 3 H | 2 H |
| 10 days | 3 H | 3 H | 3 H | 2 H | 2 H |
| 11 days | 3 H | 3 H | 3 H | 3 H | 3 H |
| 14 days | 4 H | 3 H | 3 H | 3 H | 3 H |
| 22 days | 4 H | 3 H | 3 H | 3 H | 3 H |
| 28 days | 4 H | 3 H | 3 H | 3 H | 3 H |

Comparative viscosities of Examples 13 (with bis-silylamine) and 13C (with aminosilane):

| Viscosity: Brookfield #3 Spindle | | |
| --- | --- | --- |
|  | Ex. 13 | Ex. 13C |
| Room temperature: | | |
| Initial (cps)* | 230 | 228 |
| 1 hour | 254 | 252 |
| 2 hours | 262 | 260 |
| 3 hours | 262 | 264 |
| 4 hours | 262 | 300 |
| 24 hours | 230 | 280 |
| 120° F. oven: | | |
| 9 days | 304 | 460 |
| 14 days | 380 | 640 |
| 22 days | 680 | 1500 |
| 28 days | 1174 | 30,000 |

*Viscosity measured in centipoises (cps) on LVT Brookfield Viscometer #3 spindle at 30 rpm and 25° C.

Thus, the coatings of this invention have decreased viscosity upon storage, especially at elevated temperatures relative to the coatings utilizing the aminosilane resin.

Having thus described exemplary embodiments of the present invention, it should be noted by those skilled in the art that the within disclosures are exemplary only and that various other alternatives adaptations and modifications may be made within the scope of the present invention. Accordingly, the present invention is not limited to the specific embodiments as illustrated herein but is only limited by the following claims.

The invention claimed is:

1. An ambient temperature curing coating composition comprising the crosslinked reaction product of:
   (a) an amino-functional compound, wherein the amino-functional compound is a bis-silylamine of general formula:

$(R^2)_b(R^1Y)_a Si-Q^1-NH-Q^2-(NH-Q^3)_n-Si(YR^1)_a(R^2)_b$ $n \geq 0$
   $a = 3-b$
   $b = 0, 1, 2$
   each Y is independently a heteroatom, selected from O, N; if Y is N, then the valency of Y is 2; if Y is O, then the valency of Y is 1;
   each $R^1$ is independently a monovalent radical including but not limited to linear alkyl, branched alkyl, cycloalkyl, aryl, allyl, or aralkyl;
   $R^1$ is an alkyl of 1-10 carbon atoms, each $R^1$ may be the same or different;
   $R^2$ is a monovalent radical, and can include a heteroatom not directly bonded to the silicon atom, including but not limited to, linear alkyl, branched alkyl, cycloalkyl, aryl, allyl, or aralkyl and wherein each $R^2$ may be the same or different;
   $Q^1, Q^2, Q^3$ is a divalent bridging group, including but not limited to an alkylene, and can be branched or cyclic; each Q can be the same or different; and
   (b) an acrylic polymer containing pendant organofunctional α-silane groups.

2. The coating composition of claim 1 wherein the bis-silylamine is at least one percent by weight of the total coating composition.

3. The coating composition of claim 1 wherein the bis-silylamine is between about 1 percent by weight and about 35 percent by weight of the coating composition.

4. The coating composition of claim 1, wherein the composition comprises from about 1 percent by weight to about 35 percent by weight of the bis-silylamine and from about 25 percent by weight to about 99 percent by weight of the acrylic polymer containing pendant organofunctional α-silane groups.

5. The coating composition of claim 1, wherein the acrylic polymer containing pendant organofunctional α-silane groups comprises from about 1% by weight to about 35% by weight of organofunctional α-silane, based on the total weight of the acrylic polymer containing pendant organofunctional α-silane groups.

6. The coating composition of claim 1, wherein the bis-silylamine is a bis-(trialkoxysilylalkyl)amine.

7. The coating composition of claim 1, wherein the bis-silylamine is selected from the group consisting of bis-(3-trimethoxysilylpropyl)amine, bis-(3-triethoxysilylpropyl)amine, bis-(3-trimethoxysilyl 2-methylpropyl) amine, and bis-(3-triisopropoxysilylpropyl) amine, and N-(3-triethoxysilylpropyl)-N-(5-triethoxysilylpentyl)amine.

8. A process for the preparation of a coating composition comprising:
   (a) providing an amino-functional compound, wherein the amino-functional compound is a bis-silylamine of general formula:

$(R^2)_b(R^1Y)_a Si-Q^1-NH-Q^2-(NH-Q^3)_n-Si(YR^1)_a(R^2)_b$ $n \geq 0$
   $a = 3-b$
   $b = 0, 1, 2$
   each Y is independently a heteroatom, selected from O, N; if Y is N, then the valency of Y is 2; if Y is O, then the valency of Y is 1;
   each $R^1$ is independently a monovalent radical including but not limited to linear alkyl, branched alkyl cycloalkyl, aryl, allyl, or aralkyl;
   $R^1$ is an alkyl of 1-10 carbon atoms, and each $R^1$ may be the same or different;
   $R^2$ is a monovalent radical, and can include a heteroatoms not directly bonded to the silicon atom, including but not limited to, linear alkyl or branched alkyl, cycloalkyl, aryl, allyl, or aralkyl, and wherein
   each $R^2$ may be the same or different;
   $Q^1, Q^2, Q^3$ is a divalent bridging group, including but not limited to an alkylene, and can be branched or cyclic; each Q can be the same or different; and
   (b) combining the bis-silylamine with an acrylic polymer containing pendant organofunctional α-silane groups.

9. A coated substrate, said substrate coated with the composition of claim 1.

* * * * *